METHOD OF FORMING GALLIUM PHOSPHIDE COATINGS

Filed Dec. 16, 1969 2 Sheets-Sheet 1

INVENTORS
JOHN E. DAVEY
TITUS PANKEY, JR.

BY Melvin L. Crane,
Richard J. Simmons
ATTORNEY

METHOD OF FORMING GALLIUM PHOSPHIDE COATINGS

Filed Dec. 16, 1969 2 Sheets-Sheet 2

INVENTORS
JOHN E. DAVEY
TITUS PANKEY, JR.
BY [signature]
ATTORNEY

United States Patent Office 3,690,915

Patented Sept. 12, 1972

3,690,915
METHOD OF FORMING GALLIUM PHOSPHIDE COATINGS

John E. Davey, Alexandria, Va., and Titus Pankey, Jr., Washington, D.C., assignors to the United States of America as represented by the Secretary of the Navy Filed Dec. 16, 1969, Ser. No. 885,572
Int. Cl. B29d *11/00;* C03c *17/00*
U.S. Cl. 117—33.3 10 Claims

ABSTRACT OF THE DISCLOSURE

Gallium phosphide (GaP) films evaporated onto amorphous or crystalline substrates held at a particular temperature from that of separate sources of Ga and P, each held at a particular temperature exhibit an optical absorption edge shift from a bulk position of 2.34 ev., down to about 0.8 ev. By appropriate deposition of GaP films onto a substrate and/or by vacuum-annealing of films so deposited, the optical absorption edge can be shifted to any position between 0.8 ev. and 2.34 ev. Thus, GaP films may be deposited and then properly annealed to provide films that cover the entire absorption spectrum of the III–V compounds (with the exception of InAs and InSb) plus Ge and Si. Such films may be used as optical filters of variable index of refraction and extinction coefficient to cover the entire range of energies between 0.8 and 2.34 ev.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heretofore various types of semiconducting substances have been deposited onto a substrate by use of a three temperature zone technique for use in electric, photoelectric or optical devices. Such films may be deposited from semiconducting elements or separate compounds. These compounds may be selected from the so-called $A_{III}B_{V}$ compounds i.e. Compounds formed of an element from the third group (boron, aluminum, gallium, indium) of the periodic system with an element from the fifth group (nitrogen, phosphorus, arsenic, antimony). Such compounds comprise BN, BP, BAs, AlN, AlAs, AlSb, GaN, GaP, GaAs, GaSb, InN, InP, InAs, and InSb. In order to form layers of these alloys on a substrate the required vaporizing temperatures are determined by the vapor pressure curves of the respective elements.

Studies of some of the above semiconductor alloys have been carried out to determine a suitable semiconductor alloy that exhibits a wide range optical absorption shift. Several semiconductor alloys have been studied and measurements made over a range in temperature of from 250° C. to about 425° C. without any observable systematic deviation from bulk values, these observations rule out any casual relationship between changes in lattice constant and the optical absorption-edge shift. The alloys studied are GaSb, bulk Ge, bulk Si, bulk InP, bulk GaAs, and bulk AlSb.

SUMMARY OF THE INVENTION

This invention embodies the deposition of gallium phosphide films by a four-temperature-zone technique under varying conditions which shifts the optical absorption edge. The gallium phosphide films are deposited onto a substrate held at a particular set temperature during deposition. GaP films deposited with the substrate held at different set temperatures between about 150° C. and about 425° C. will possess different absorption curves. Vacuum-annealing such deposited films will further change the absorption edge. It has been determined that gallium phosphide films deposited by the above system at a temperature between the above temperature ranges will have an absorption edge shift between an 0.8 ev. band gap and a 2.34 ev. band gap. A plurality of GaP films may be deposited onto a single substrate in accordance with the teaching of this invention to provide an unitary optical absorption filter which may be used to cover the band gap between 0.8 ev. to 2.34 ev.

STATEMENT OF THE OBJECTS

It is therefore an object of the present invention to provide variable band gap GaP films.

Another object is to provide optical absorption films which have different absorption quantities.

Still another object is to provide a method of forming optical absorption films of a single alloy that may be used for optical absorption over a wide range.

Yet another object is to provide a method of forming optical absorption films of a single alloy which may possess different index of refraction and extinction coefficients.

The nature of this invention as well as other objects and advantages thereof will be readily apparent from consideration of the following specification relating to the annexed drawing.

Figure 1:
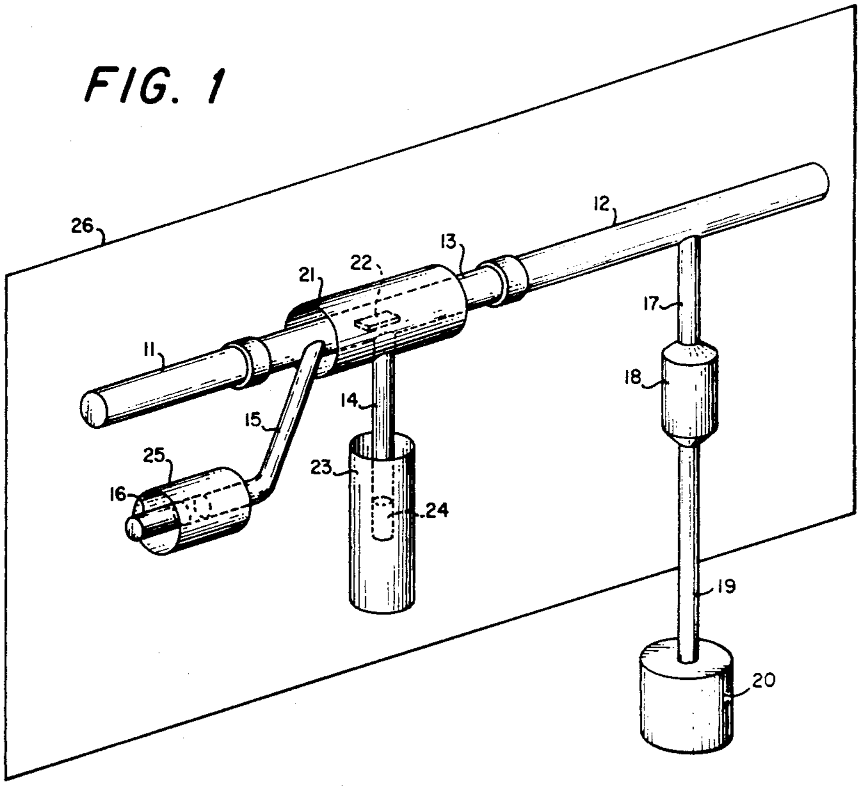
FIG. 1 illustrates a four temperature vacuum system for depositing GaP films onto a substrate.

Now referring to the drawings there is shown in FIG. 1 a system suitable for depositing a GaP film onto a substrate. The system includes a linear tube formed by two closed end sections 11 and 12 and an open end section 13 each of which are made of a material such as Pyrex to withstand high temperatures. The middle open ended section 13 has a centrally located closed end tube 14 extending downwardly therefrom at a 90° angle relative thereto. A second closed end tube 15 is secured to the mid-section 13 at a distance removed from tube 14 and at an angle relative thereto. The tube 15 is also made with an angle wherein the lower most end 16 is substantially parallel with tube end 11 of the main tube. The end tube 12 has connected thereto a tube 17 which is normal thereto and parallel with tube 14. A particulate valve 18 is secured to tube 17 and then tube 19 is connected with the particulate valve outlet and then to a vacuum sysetm 20 for evacuating the tubular system.

The system also includes a heater or oven 21 surrounding tubular section 13 within which in operation there is placed a substrate 22 such as quartz upon which a GaP film is deposited. Closed-end tube 14 has a heater or oven 23 surrounding the closed end portion within which a gallium source 24 is placed for evaporation heating. A heater 25 is placed around the tubular end 16 of tube 15 within which phosphorus powder is placed for vaporation heating. The entire tubular system including the heaters are placed within a housing 26 which is provided with a heating means for heating the area surrounding the deposition system.

In operation of the system for depositing a GaP film onto a substrate, gallium metal is placed into tube 14 such that it is surrounded by heater 23. Phosphorus powder is placed within tube end 16 and surrounded by heater 25. The substrate is placed onto a substrate holder in tubular section 13 and then the open ends of tubular ends 11 and 12 are secured to the open ends of tube 13 to close off the system. The entire tubular system is surrounded by a housing in which the area surrounding the deposition system is heated to a temperature of 150° C. for several hours prior to deposition of the GaP film. The temperature of 150° C. is necessary to prevent the phosphorus vapors from sticking to the tube as they diffuse up tube 15 into tubular section 13. The system is then evacuated by the vacuum pump to a pressure of about $10^{-7}$ mm. of mercury and maintained at this vacuum level, as measured at the vacuum pump, during deposition of the film. The heaters 21, 23 and 25 are heated to a desired temperature and maintained at the desired temperature until a GaP film of the desired thickness has been coated onto the substrate. For best results the GaP film is deposited at from 5000 angstroms to about 7000 angstroms per hour. In depositing GaP films onto a substrate, it has been determined for best results that the temperature of the gallium should be about 935° C., for the phosphorus about 335° C. whereas the temperature of the substrate is held at a temperature depending on the absorption characteristics desired as will be set forth below. The temperature range of the substrate may vary from the housing temperature of 150° C. up to 425° C. Whatever substrate temperature is selected, that temperature is maintained for the period of operation for depositing the GaP film onto the substrate. It has been determined that GaP films can be deposited onto a substrate for construction of optical filters each of which have a different index of refraction, *n*, and extinction coefficient, *k*, that range in value between an 0.8 ev. band gap and a 2.34 ev. band gap depending on the deposition conditions and annealing conditions. In order to obtain a 2.34 ev. band gap, the films after being deposited as described above must be annealed which will described hereinafter.

Figure 2:
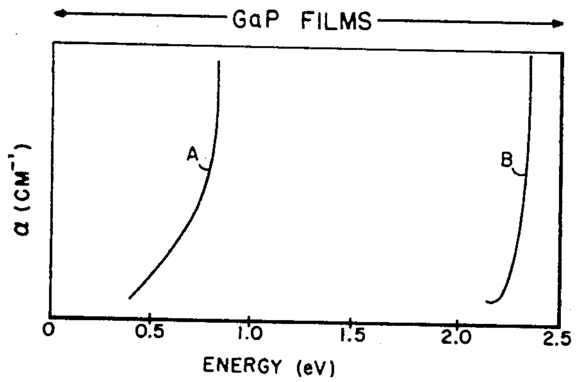
FIG. 2 illustrates the optical absorption curves for different GaP films deposited onto a substrate maintained at 150° C. and a substrate held at 450° C.

FIG. 2 illustrates optical absorption curves for two different GaP films deposited onto substrates maintained at different temperatures. As shown, the curve illustrates wavelength vs. energy (ev.). Curves A and B were obtained by use of a GaP film deposited onto a Pyrex substrate with the gallium heated to 925° C., phosphorus heated to a temperature of 335° C. with curve A being deposited onto a substrate heated to 150° C. whereas for curve B, the substrate was heated to 425° C. during the time of deposition of the film onto the substrate with subsequent annealing at 600° C. The films were each deposited to a thickness of about 10,000 angstroms. The deposition time involved was about two hours since the films are deposited at a rate of from 5000 angstroms to about 7000 angstroms per hour. As shown, by changing only the temperature of the substrate and all other factors being the same, the effective optical band gap was shifted by about 1.4 ev. from the GaP films of curve A to curve B.

Figure 3:
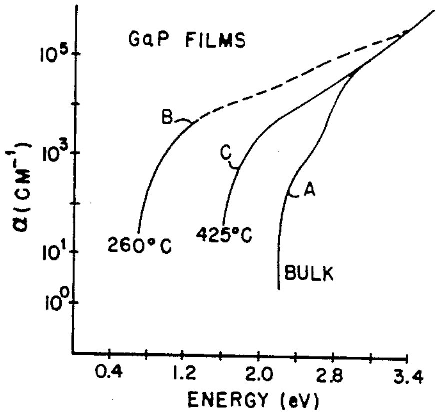
FIG. 3 illustrates optical absorption curves of GaP deposited onto different substrates at different temperatures and film thickness compared with bulk GaP films.

FIG. 3 illustrates quantitative measurements made to determine the character of the optical absorption shift. In FIG. 3, curve A represents the optical absorption data taken on single-crystal bulk GaP as a reference. Curve B illustrates data taken on a 6000 A. and a 39,000 A. thick GaP film, each deposited at a substrate temperature of 260° C. by the above described technique. The 39,000 A. film (solid line) allows measurements to be made to fairly low absorption levels ($10^{-2}$ cm. $^{-1}$). While the 6000 A. film (dotted line) allows measurements to high absorption levels. Even though the films are of different thickness, but deposited at the same temperature, the data presents a good match and is typical of all GaP films deposited at 260° C. Curve C illustrates the optical absorption curve for a 33,000 A. thick GaP film deposited at 425° C. with the same technique as described above. As shown the absorption edge has shifted toward the bulk, however there is still a considerable shift toward lower energies.

As shown heretofore, the optical absorption edge of different GaP films may be shifted from a low energy to a higher energy by depositing the GaP onto a different substrate maintained at a different temperature during deposition. It has been determined that extensive whisker growth occurs in the surface of the films at substrate deposition temperature above 425° C. In view of the above, it has been determined that GaP films may be deposited onto a substrate by the above described method with the substrate at a temperature up to 425° C. with subsequent annealing at about 600° C. for specific times in order to shift the optical absorption edge to the bulk optical behavior.

Figure 4:
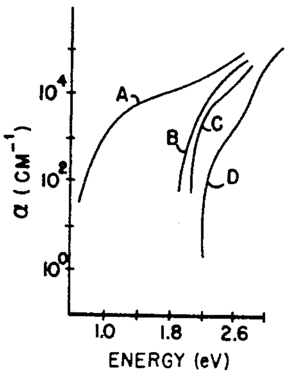
FIG. 4 illustrates the effect of annealing a GaP film deposited onto a substrate.

FIG. 4 illustrates the effect of annealing on the optical absorption edge of GaP films. As shown, curve A illustrates the absorption data on a GaP film deposited with the substrate at 260° C. with no subsequent annealing. Curve B illustrates the effect resulting from annealing the GaP film shown in curve A for a period of 24 hours at a temperature of 460° C. Curve C illustrates further annealing of the GaP film of curve B for a period of 24 hours at 510° C. It has been determined that further annealing of the GaP film of curve C at 575° C.–600° C. will shift the optical absorption edge to that of bulk, curve D.

It has been shown above that GaP films may be deposited onto a substrate with the substrate at a temperature of from 150° C. up to about 425° C. to provide GaP films that have a specific optical absorption edge. Further, it has been shown that GaP films deposited onto a substrate at a temperature up to 425° C. may be subsequently annealed for a period of time to shift the absorption edge toward that of bulk.

Figure 5:
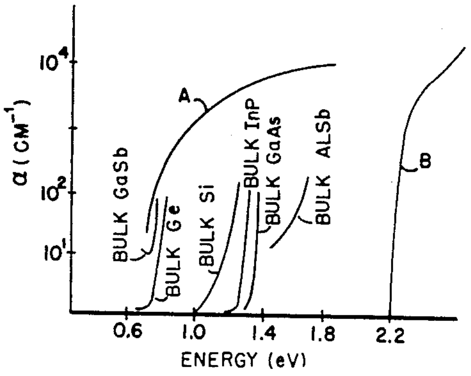
FIG. 5 illustrates optical absorption data for a GaP film deposited at 260° C. and are annealed to bulk behavior as compared with the optical absorption data of bulk III–V compounds plus Si and Ge.

FIG. 5 illustrates the optical absorption edge of a GaP film deposited at 260° C., curve A, with subsequent annealing for a long period of time at 600° C., to shift the optical absorption edge to that of bulk, curve B. These optical absorption edges are compared with those of optical absorption data for nearly all of the bulk III–V compounds plus Si and Ge. As shown, GaP films deposited onto a substrate at 260° C. with subsequent annealing at different annealing times could be made to have the same optical absorption characteristics of nearly the entire spectral absorption range of the III–V compounds including Ge and Si, as shown by the curves of FIG. 5.

Figure 6:
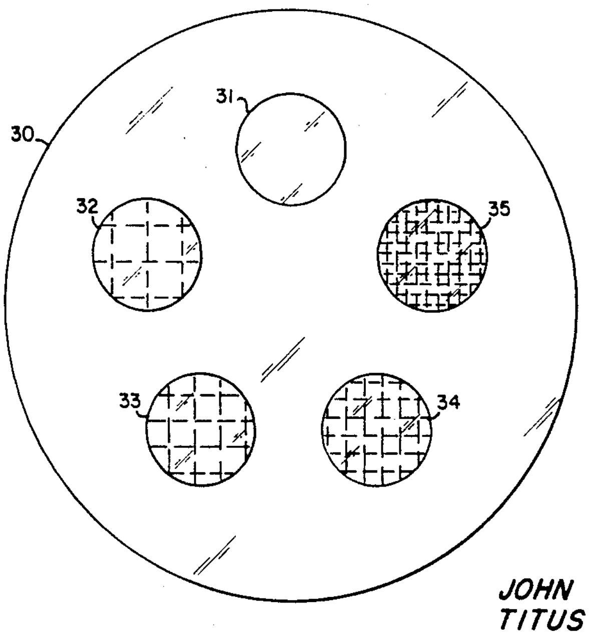

Further, it has been determined that a plurality of GaP films may be deposited onto a single substrate to provide a single base element 30 (FIG. 6) with separate optical absorption filters 31–35 that range between an 0.8 ev. band gap and a 2.34 ev. band gap. This may be formed by depositing the first filter 31 with the substrate held at say 425° C. with subsequent annealing to shift the optical absorption edge to the bulk, FIG. 6. The next GaP film 32 may be deposited at the same 425° C. onto a different area of the substrate with subsequent annealing for a lesser time at the same temperature to provide an optical absorption filter between 425° C. and the bulk. The next GaP film 33 could be deposited with the substrate at 425° C. without any subsequent annealing and the optical absorption edge will be as previously shown for the GaP film deposited at 425° C. in FIG. 3. Subsequent filters 34 and 35 may be deposited onto the same substrate at different locations at a different temperature reduced from the previous temperature of 425° C. down to 150° C. at which the housing is maintained. It is not possible to deposit a plurality of different films starting at a lower temperature with subsequent increase in temperature since the increase in temperature would shift all films toward bulk so that at the end all films would be the same as bulk.

As described above, it is seen that GaP films may be shifted in optical absorption from one value to bulk or to any value between the optical absorption of the originally deposited film and that of bulk. It has been shown that the GaP films deposited onto a substrate at a low temperature must be annealed to shift it toward bulk. The time required is usually long therefore a method has been determined for shortening the annealing time. In order to shorten the annealing time, the GaP film coated substrate may be placed into an overpressure of phosphorus vapor and annealed at about 700° C. Annealing in an overpressure of phosphorus and at 700° C. drastically reduces the time required to shift the optical absorption edge of a GaP film deposited at a low relative temperature to an optical absorption edge closer to bulk or even to bulk.

It has been found that GaP films deposited at about 250° C. are metallic in appearance, nontransparent, and exhibit an extremely large optical absorption-edge shift of about 1.5 ev., to lower energies, and that these strongly textured films exhibit the same lattice constant as bulk GaP to within experimental error. It has also been determined that films deposited below 240° C. are amorphous to X-rays and reflection-electron-diffraction, RED, and yet exhibit the same metallic, nontransparent appearance and large optical absorption-edge shift. By comparison, it can be concluded that the lack of long-range order is not the primary cause of this optical absorption-edge shift.

It has been found that GaP films deposited at 425° C. are transparent, but with an energy gap which is still shifted to lower energies than bulk GaP. In either the low temperature films (250° C.) or the films deposited at 425° C., annealing for long times at about 600° C. will cause the optical absorption edge to shift to bulk values. To take the extreme case, the non-transparent, metallic-appearing film, which is deposited at 250° C., becomes the characteristic transparent yellow of bulk GaP with adequate annealing to 600° C.

It is emphasized that the absorption properties of these films cover practically the entire range of behavior of the III–V compounds. This is shown qualitatively in FIG. 5; with proper annealing, a GaP film deposited at 250° C. can be swept through nearly the entire spectral absorption range of the III–V compounds, including Ge and Si.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of forming a GaP film onto a substrate to provide an optical absorption edge having a band gap located between 0.8 ev. and 1.80 ev. which comprises, heating a GaP deposition system within a surrounding temperature of 150° C., heating said substrate within said system to a set temperature within a range from about 150° C. to about 425° C., heating Ga in said system to a temperature of about 935° C., heating P in said system to a temperature of about 335° C., maintaining said substrate, said Ga and said P at said set temperatures for a period of time sufficient to deposit a GaP film of a desired thickness onto said substrate, and annealing said GaP film at about 600° C.

2. A method of forming a GaP film onto a substrate as claimed in claim 1; wherein, said substrate is held at a temperature of about 250° C. to produce a GaP film on said substrate which has an optical absorption band gap of 0.8 ev.

3. A method as claimed in claim 1; wherein, said substrate is held at a temperature of about 425° C. to produce a GaP film on said substrate which has an optical absorption band gap of about 1.80 ev.

4. A method as claimed in claim 1; wherein, said substrate is held at a temperature less than 425° C. but greater than 250° C. to produce a GaP film on said substrate which has an optical absorption band gap less than 1.8 ev. but greater than 0.8 ev.

5. A method as claimed in claim 2, in which:

said GaP film is annealed at about 600° C. for a period of time sufficient to shift the optical absorption band gap to a value greater than 0.8 ev. but less than 2.34 ev.

6. A method as claimed in claim 3, wherein:

said Gap film is annealed at about 600° C. for a period of time sufficient to shift the optical absorption band gap from 1.80 ev. to that of bulk GaP films.

7. A method of forming a GaP film having a variable band gap from about 0.8 ev. to about 2.34 ev., which comprises:

depositing a GaP film onto a substrate maintained at about 150° C. to provide a GaP film having an optical absorption band gap of about 0.8 ev., subsequently annealing said GaP film at a temperature of about 600° C. for a sufficient time to shift the optical absorption band gap to a higher value.

8. A method as claimed in claim 7; wherein, said annealed GaP film is further annealed at a higher temperature than used during said previous annealing to shift the optical absorption band gap to that of bulk GaP films.

9. A method of forming a composite filter element having a plurality of filters each having a different optical absorption edge included in a band gap range from 0.8 ev. to about 1.8 ev. which comprises, depositing a first GaP film onto a portion of a substrate maintained at a first temperature of about 450° C., permitting said substrate to cool to a second temperature which is less than 450° C. and greater than 150° C. and depositing a GaP film onto a second portion of said substrate while maintaining said substrate at said second temperature, permitting said substrate to cool to a third temperature which is less than said second temperature and greater than 150° C. and depositing a GaP film onto a third portion of said substrate while maintaining said substrate at said third temperature, permitting said substrate to cool to a temperature less than in the previous step and depositing a GaP film onto a portion of said substrate maintained at said lesser temperature for as many filters desired where said temperature of said substrate for the least temperature is 150° C. and said optical absorption band gap is 0.8 ev. and annealing each GaP film after the deposition of each GaP film at a temperature of about 600° C.

10. A method as claimed in claim 9 wherein the band gap is a range between 0.8 ev. and 2.34 ev., in which said first GaP film is annealed for a time sufficient to shift the optical absorption edge from 1.8 ev. to 2.34 ev., subsequent to annealing said first GaP film cooling said substrate to 450° C. and depositing a second GaP film at a temperature of 450° C., annealing said second film deposited at 450° C. for a time sufficient to shift the band gap between 1.8 ev. and 2.34 ev., permitting said substrate to cool to 450° C. and depositing another GaP film with the temperature held at 450° C. to deposit another GaP film onto said substrate.

References Cited

UNITED STATES PATENTS

| | | | |
|---|---|---|---|
| 2,938,816 | 5/1966 | Gunther | 117—106 X |
| 3,094,388 | 6/1963 | Johnson et al. | 117—106 X |
| 3,224,913 | 12/1965 | Ruehrwein | 117—106 X |
| 3,305,385 | 2/1967 | Pizzarello | 117—106 |
| 3,372,282 | 5/1968 | Bressler | 350—1 X |
| 3,441,453 | 4/1969 | Conrad et al. | 117—106 X |
| 3,442,572 | 5/1969 | Illsley et al. | 350—1 X |
| 3,480,472 | 11/1969 | Dersin et al. | 117—106 X |

FOREIGN PATENTS

| | | | |
|---|---|---|---|
| 540,619 | 5/1956 | Germany | 117—106 X |

OTHER REFERENCES

Harrison et al.: IBM Technical Disclosure Bulletin, "Preparation of Films of III–V Compounds," vol. 4, No. 1, June 1961, p. 32.

WILLIAM D. MARTIN, Primary Examiner

M. R. P. PERRONE, Jr., Assistant Examiner

U.S. Cl. X.R.

117—62, 105.5, 106 A, 106 R, 124 B; 350—1, 164, 165, 166